(12) United States Patent
Mordukhovich et al.

(10) Patent No.: US 12,502,956 B1
(45) Date of Patent: Dec. 23, 2025

(54) DUAL COAXIAL MOTORS ELECTRIC DRIVE MODULE WITH PERMANENT MAGNET PRIMARY AND INDUCTION MOTOR SECONDARY WITH PLANETARY GEAR SET AND DIFFERENTIAL

(71) Applicant: FCA US LLC, Auburn Hills, MI (US)

(72) Inventors: Gregory Mordukhovich, Auburn Hills, MI (US); Marco Vassallo, Turin (IT)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/913,267

(22) Filed: Oct. 11, 2024

(51) Int. Cl.
*B60K 17/16* (2006.01)
*B60K 7/00* (2006.01)
*B60K 23/08* (2006.01)
*B60K 17/04* (2006.01)

(52) U.S. Cl.
CPC ........ *B60K 23/0808* (2013.01); *B60K 7/0007* (2013.01); *B60K 17/16* (2013.01); *B60K 17/046* (2013.01); *B60K 17/165* (2013.01); *B60K 2023/0858* (2013.01)

(58) Field of Classification Search
CPC .. B60K 23/0808; B60K 7/0007; B60K 17/16; B60K 17/046; B60K 17/165; B60K 2023/0858
See application file for complete search history.

(56) References Cited

U.S. PATENT DOCUMENTS

2010/0262356 A1* 10/2010 Maruyama ............ B60W 10/06
123/568.21

FOREIGN PATENT DOCUMENTS

| CN | 114211946 A | * | 3/2022 | |
|---|---|---|---|---|
| CN | 115723544 A | * | 3/2023 | |
| CN | 113415107 B | * | 6/2023 | ............... B60K 1/00 |
| DE | 102020006868 A1 | * | 5/2022 | |

* cited by examiner

*Primary Examiner* — Justin Holmes
(74) *Attorney, Agent, or Firm* — Jeremy J. Klobucar

(57) ABSTRACT

An electrified powertrain that generates and transfers drive torque to a driveline of an electrified vehicle is provided. The electrified powertrain includes an electric drive module (EDM), and a controller. The EDM includes a first electric motor coupled to a first output shaft through a planetary gear set and a differential; a second electric motor selectively coupled to a second output shaft through the planetary gear set and the differential; and a clutch. The clutch moves between a first position that decouples the second electric motor from the planetary gear set and therefore the second output shaft; and a second position that couples the second electric motor to the planetary gear set and the second output shaft.

18 Claims, 3 Drawing Sheets

DUAL COAXIAL MOTORS ELECTRIC DRIVE MODULE WITH PERMANENT MAGNET PRIMARY AND INDUCTION MOTOR SECONDARY WITH PLANETARY GEAR SET AND DIFFERENTIAL

FIELD

The present application generally relates to electrified vehicles and, more particularly, to an electric drive module having dual coaxial electric motors with a permanent magnet primary motor, an induction motor secondary motor, a planetary gear set and a differential.

BACKGROUND

An electrified vehicle (hybrid electric, plug-in hybrid electric, range-extended electric, battery electric, etc.) includes at least one battery system and at least one electronic drive module having at least one electric motor and associated electric drive gearbox assembly. Typically, the electrified vehicle would include a high voltage battery system and a low voltage (e.g., 12 volt) battery system. In such a configuration, the high voltage battery system is utilized to power at least one electric motor configured on the vehicle and to recharge the low voltage battery system via a direct current to direct current (DC-DC) convertor. The electric drive gearbox assembly can be configured in many ways to achieve various gear ratios for accessing during specific drive conditions. In some dual motor examples however it can be inefficient operating both motors concurrently providing more power and torque than is needed. Accordingly, while such electronic drive modules do work well for their intended purpose, there is a desire for improvement in the relevant art.

SUMMARY

According to one example aspect of the invention, an electrified powertrain that generates and transfers drive torque to a driveline of an electrified vehicle is provided. The electrified powertrain includes an electric drive module (EDM), and a controller. The EDM includes a first electric motor coupled to a first output shaft that drives a first drive wheel; a second electric motor selectively coupled to a second output shaft; and a clutch. The first output is coupled to the first output shaft through a planetary gear set and a differential. The second output is coupled to the second output shaft through the differential. The clutch moves between a first position that decouples the second electric motor from the second output shaft, wherein in the first position drive torque is provided to the first and second drive wheels exclusively from the first electric motor; and a second position that couples the second electric motor to the second output shaft, wherein in the second position the first and second electric motors drive the first and second drive wheel through the planetary gear set and the differential. The controller controls operation of the clutch based on operating conditions.

In some examples, the planetary gear set comprises a ring gear that is selectively driven by the second electric motor and a sun gear that is driven by the first electric motor.

In other examples, the planetary gear set comprises a carrier that is drivingly engaged to the differential.

In some implementations, the electrified powertrain includes a first reducer disposed between the first output shaft and the first drive wheel; and a second reducer disposed between the second output shaft and the second drive wheel.

In some implementations, at least one of the first and second electric motors are induction motors.

In some implementations, at least one of the first and second electric motors are permanent magnet motors.

In some implementations, the clutch is a controllable one way clutch.

In examples, the first and second electric motors are coaxially arranged.

In additional features, the controller is configured to command the clutch to operate in the first position based on low torque operating conditions.

In other features, the controller is configured to command the clutch to operate in the second position based on high torque request operating conditions.

In other features, the electric drive module is operable in a first drive mode wherein only the first electric motor provides drive torque and in a second drive mode wherein both of the first and second electric motors provide drive torque.

According to another example aspect of the invention, an electrified powertrain that generates and transfers drive torque to a driveline of an electrified vehicle is provided. The electrified powertrain includes an electric drive module (EDM) including a first electric motor having a first output drivingly coupled to a first output shaft that drives a first drive wheel; and a second electric motor having a second output selectively coupled to a second output shaft that drives a second drive wheel. The first output is coupled to the first output shaft through a planetary gear set and a differential. The second output is coupled to the second output shaft through the planetary gear set and the differential.

In examples, the first and second electric motors are coaxially arranged.

In other features, the electric drive module is operable in a first drive mode wherein only the first electric motor provides drive torque and in a second drive mode wherein both of the first and second electric motors provide drive torque.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As discussed above, in some EDM's having dual motors, it can be inefficient operating both motors concurrently providing more power and torque than is needed. In particular, in some prior art dual motor configurations, both motors provide all power and torque during full driving cycles and are on all the time regardless of the required power and torque. For example, during high speed highway driving where only low torque is necessary, operating both electric motors is inefficient.

The instant disclosure provides an EDM that incorporates two coaxial electric motors, a planetary gear set and a differential. In a first power flow arrangement, the EDM is configured to operate in two modes for optimal efficiency. In a first drive mode, a first electric motor is coupled to first and second output shafts through a planetary gear set and differential in a first highway drive mode. Only the first electric motor provides a power input. In a second drive mode, the first electric motor is coupled to first and second output shafts through a planetary gear set and a differential while a second electric motor is coupled to the planetary gear set through a controllable one way clutch (COWC). In a second power flow arrangement, a first electric motor is coupled to first and second output shafts through a planetary gear set and differential while a second electric motor is also coupled to the first and second output shafts through the planetary gear set and the differential. In the exemplary first and second power flow arrangements, the first electric motor is coupled to the sun gear of the planetary gear set while the second electric motor is coupled to the ring gear of the planetary gear set. In both of the first and second power flow arrangements, a desired torque reduction ratio is provided by the planetary gear set by varying the speeds of the first and second electric motors.

The disclosed configurations all increase efficiency of the EDM requiring reduced time when both the electric motors need to be on such as during turning. Further, decreased battery weight and cost is required. Distances between recharging are further increased. Further, the planetary gear set acts as a variable speed transmission by varying the speeds of the first and second electric motors depending upon operating modes and conditions.

Figure 1:
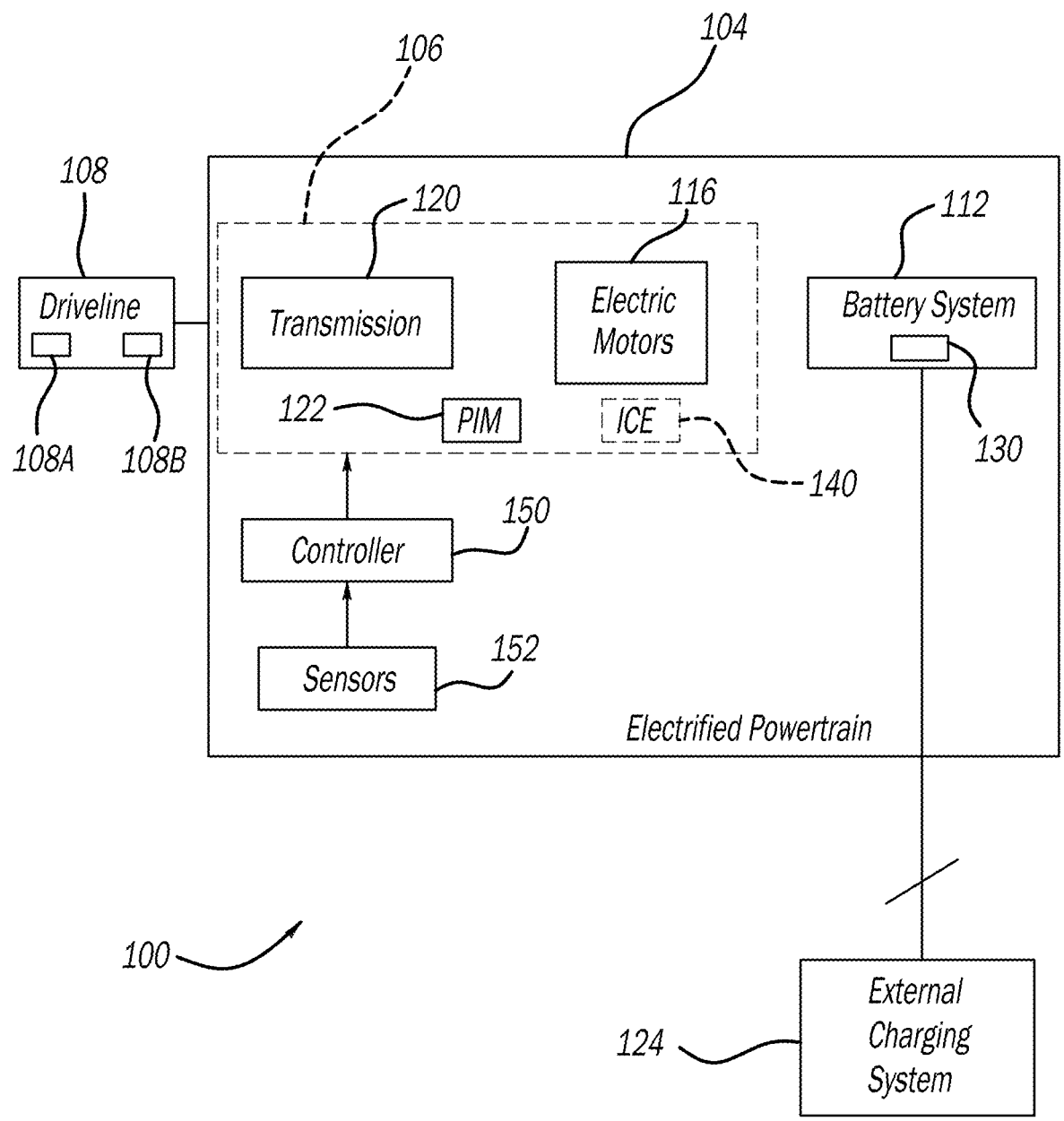
FIG. 1 is a functional block diagram of an electrified vehicle having an electronic drive module (EDM) according to various principles of the present application.

Referring now to FIG. 1, a functional block diagram of an example electrified vehicle 100 (also referred to herein as "vehicle 100") according to the principles of the present application is illustrated. The vehicle 100 includes an electrified powertrain 104 having an electric drive module (EDM) 106 configured to generate and transfer drive torque to a driveline 108 for vehicle propulsion. The EDM 106 generally includes two electric motors, collectively identified at 116 (e.g., electric traction motors), an electric drive gearbox assembly or transmission, collectively identified at 120, and power electronics including a power inverter module (PIM) 122.

The electric motors 116 are selectively connectable via the PIM 124 to a high voltage battery system 112 for powering the electric motors 116. The battery system 112 is selectively connectable (e.g., by the driver) to an external charging system 124 (also referred to herein as "charger 124") for charging of the battery system 112. The battery system 112 includes at least one battery pack assembly 130. In some examples, described herein, the electrified powertrain 104 can be a hybrid powertrain that additionally includes an internal combustion engine 140. A controller 150 can provide various inputs to the EDM 106, based on signals received from sensors 152 to operate the EDM in various modes based on operating conditions as described herein.

With additional reference now to FIGS. 2A and 2B, an EDM 106 constructed in accordance to a first example of the present disclosure will be described. The EDM 106 includes a first electric motor 116A, a second electric motor 116B, a planetary gear set 158, a differential 160 and a controllable one way clutch (COWC) 161. While the planetary gear set 158 and the differential 160 are shown arranged generally within the first electric motor 116A, they may be disposed in other axially shifted positions within the scope of this disclosure. The differential 160 can include planet gears 162A, 162B rotatably coupled to a carrier 164. The planet gears 162A, 162B are meshed for rotation with output gears 164A, 164B. In the example shown the output gear 164A drives the output shaft 180A while the output gear 164B drives the output shaft 180B.

The clutch 161 is represented as a COWC clutch, however the clutch 161 may take other forms such as a dog clutch or other clutch configuration. As will become appreciated, the clutch 161 selectively couples an output of the second electric motor 116B to the planetary gear set 158. The planetary gear set 158 generally includes a sun gear 182, a ring gear 184 and a carrier 186. The sun gear 182 is coupled for rotation with an output (e.g., first rotor 117A) of the first electric motor 116A. The ring gear 184 is coupled for rotation with an output (e.g., second rotor 117B) of the second electric motor 116B. The carrier 186 is fixed for rotation with the planet gears 162A, 162B of the differential 160. The planetary gear set 158 therefore introduces relative motion between the carrier 186 and the sun gear 182.

A first reducer or left final drive planetary gear set 220 communicates torque from the output shaft 180A to the drive wheel 108A. A second reducer or right final drive planetary gear set 222 communicates torque from the output shaft 180B to the drive wheel 108B. The first reducer 220 comprises a first sun gear 230, a first ring gear 232 and a first carrier 234 having a plurality of planetary gears 236. The second reducer 222 comprises a second sun gear 240, a second ring gear 242 and a second carrier 244 having a plurality of planetary gears 246.

Figures 2A, 2B:
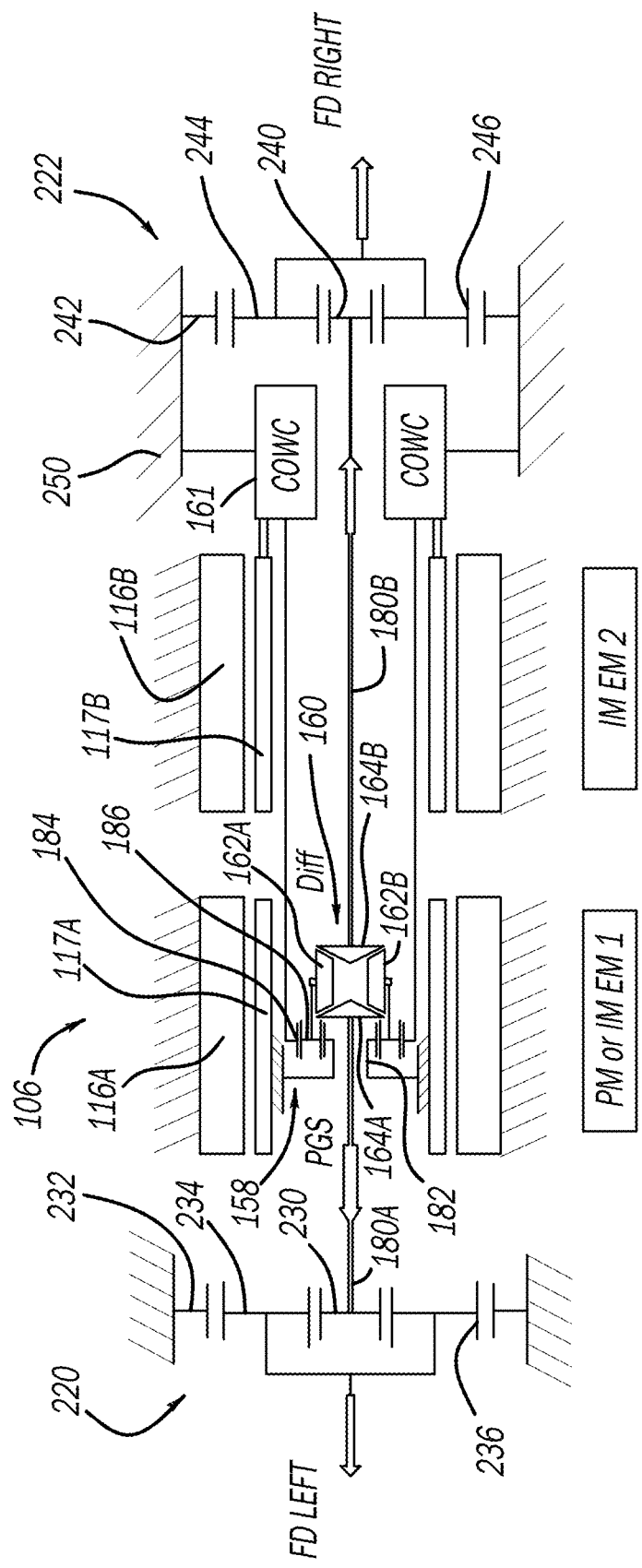
FIG. 2A is schematic illustration of an EDM having a permanent magnet (PM) or induction machine (IM) primary motor, an IM secondary motor, a clutch, and a planetary gear set and differential arranged in the primary motor according to a first example of the present application.
FIG. 2B is a table illustrating various operating modes used by the EDM of FIG. 2A according to various principles of the present application.

As shown in the Table 190 of FIG. 2B, the EDM 106 can be operated in various modes by actuating the clutch 161 between a first decoupled position and a second coupled position. In examples, the clutch 161 can be commanded to actuate based on a signal from the controller 150. In the first position, the clutch 161 decouples the second electric motor 116B from the planetary gear set 158 and locks to the housing 250. In this first position, the first electric motor 116A exclusively provides torque input through the planetary gear set 158, the differential 160 and through the reducers 220, 222 to the driveline 108.

As identified above, the first position can be used when full torque is not necessary, such as, but not limited to highway driving. In this first position, only the first electric motor 116A is on. The second electric motor 116B can be turned off saving power and running the EDM 106 more efficiently. In the second position, the clutch 161 couples the second electric motor 116B to the planetary gear set 158. Again, in the example shown, the COWC 161 couples an output of the second electric motor 116B with the ring gear 184, although other arrangements are contemplated.

The controller 150 activates the clutch 161 when speed synchronization between the first and second electric motors 116A, 116B is acceptable (e.g., based on inputs from sensors 152 such as wheel speeds and other inputs) for noise vibration and harshness (NVH). In other examples, an additional disconnect clutch can be added to the first electric motor 116A or reducer 220 for sailing and towing capabilities if a permanent magnet (PM) is used for the first electric motor 116A. In other examples, a lock-up and/or limited slip clutch can be added based on vehicle application. Operation of the electric motor 116B is not necessary for turning.

In the second position, the first and second electric motors 116A, 116B drive the first output shaft 180A, and the second output shaft 180B through the planetary gear set 158 and the differential 160. In this regard, the output gear 164A drives the first output shaft 180A, the first reducer 220 and the first drive axle/wheel 108A. Similarly, the output gear 164B drives the second output shaft 180B, the second reducer 222 and the second drive axle/wheel 108B. In the second position, both the first and second electric motors 116A, 116B provide torque input through the planetary gear set 158, the differential 160 and to the first and second output shafts 180A, 180B.

In advantages of the EDM 106, the pitch line velocity of the planetary gear set 158 is managed (and limited) by the speed ratio of the first and second electric motors 116A, 116B. There is no direct path from the ring gear 184 of the planetary gear set 158 (high speed stage) to the gear case offering a significant noise vibration and handling (NVH) risk reduction. Only one electric motor (e.g., the first electric motor 116A) is ON during the highway cycle. An additional disconnect clutch can be added to the first electric motor 116A or final drive planetary gear set 220 for sailing and towing capabilities if a PM is used for the first electric motor 116A. A lock-up and/or limited slip clutch can be added based on application goals.

Figure 3:
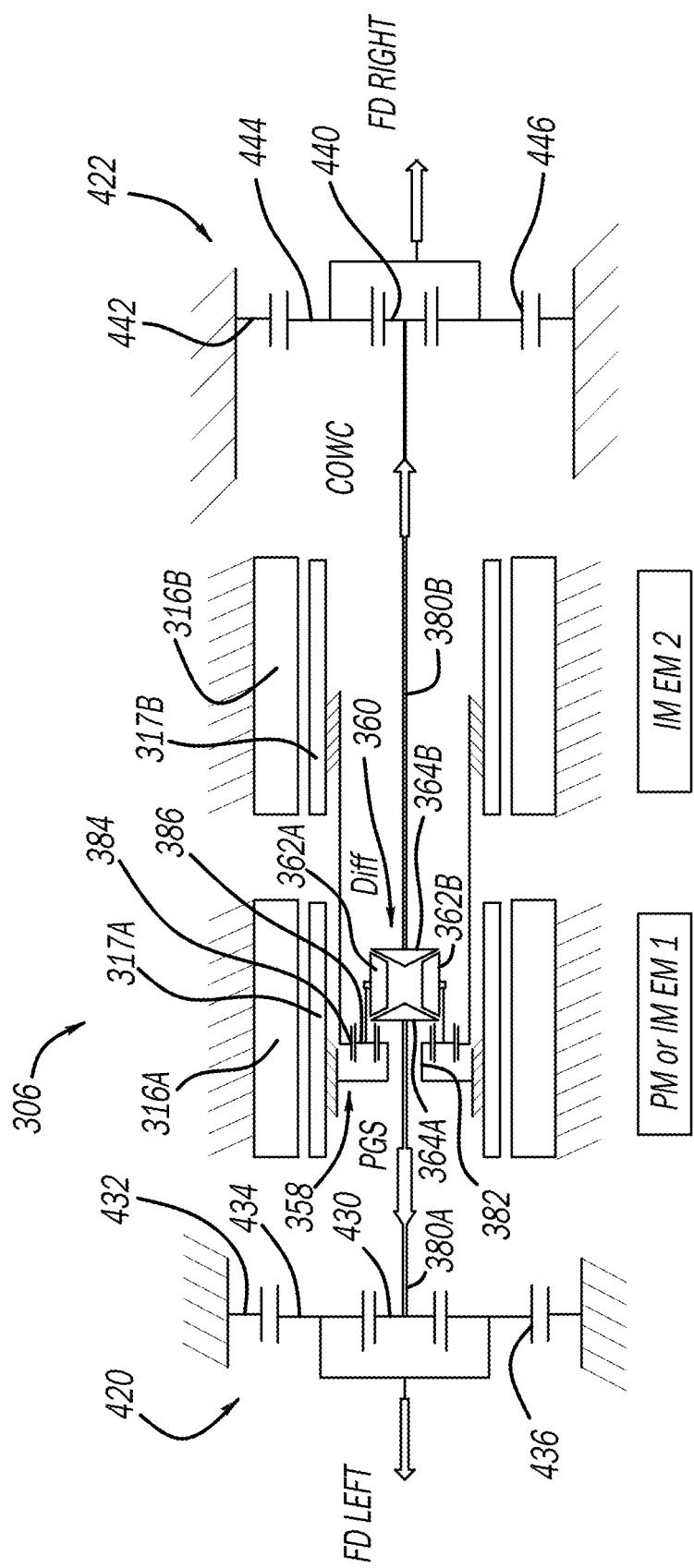
FIG. 3 is schematic illustration of an EDM having a permanent magnet (PM) or induction machine (IM) primary motor, a permanent magnet (PM) or induction machine (IM) secondary motor and a planetary gear set and differential arranged in the primary motor according to a second example of the present application.

With additional reference now to FIG. 3, an EDM 306 constructed in accordance to a second example of the present disclosure will be described. Unless otherwise described, the EDM 306 can be configured similarly to the EDM 106 described above with respect to FIG. 2A but without a clutch. The EDM 306 includes a first electric motor 316A, a second electric motor 316B, a planetary gear set 358, and a differential 360. The differential 360 can include planet gears 362A, 362B rotatably coupled to a carrier 364. The planet gears 362A, 362B are meshed for rotation with output gears 364A, 364B. In the example shown the output gear 364A drives the output shaft 380A while the output gear 364B drives the output shaft 380B.

The planetary gear set 358 generally includes a sun gear 382, a ring gear 384 and a carrier 386. The sun gear 382 is coupled for rotation with an output (e.g., first rotor 317A) of the first electric motor 316A. The ring gear 384 is coupled for rotation with an output (e.g., second rotor 317B) of the second electric motor 316B, or to the housing 250 based on a status of the COWC 161. The carrier 386 is fixed for rotation with the planet gears 362A, 362B of the differential 160.

A first reducer or left final drive planetary gear set 420 communicates torque from the output shaft 380A to the drive wheel 108A. A second reducer or right final drive planetary gear set 422 communicates torque from the output shaft 380B to the drive wheel 108B. The first reducer 420 comprises a first sun gear 430, a first ring gear 432 and a first carrier 434 having a plurality of planetary gears 436. The second reducer 422 comprises a second sun gear 440, a second ring gear 442 and a second carrier 444 having a plurality of planetary gears 446.

In advantages of the EDM 306, the pitch line velocity of the planetary gear set 358 is managed (and limited) by the speed ratio of the first and second electric motors 316A, 316B. There is no direct path from the ring gear 384 of the planetary gear set 358 (high speed stage) to the gear case offering a significant noise vibration and handling (NVH) risk reduction. A lock-up and/or limited slip clutch can be added based on application goals.

As used herein, the term controller or module refers to an application specific integrated circuit (ASIC), an electronic circuit, a processor (shared, dedicated, or group) and memory that executes one or more software or firmware programs, a combinational logic circuit, and/or other suitable components that provide the described functionality.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. An electrified powertrain that generates and transfers drive torque to a driveline of an electrified vehicle, the electrified powertrain comprising:
   an electric drive module comprising:
      a first electric motor coupled to a first output shaft through a planetary gear set and a differential, the first output shaft configured to drive a first drive wheel;
      a second electric motor selectively coupled to a second output shaft through the planetary gear set and differential, wherein the planetary gear set comprises a ring gear that is selectively driven by the second electric motor and a sun gear that is driven by the first electric motor; and
      a clutch that moves between:
         a first position that decouples the second electric motor from the second output shaft, wherein in the first position drive torque is provided to the first and second drive wheels exclusively from the first electric motor; and
         a second position that couples the second electric motor to the second output shaft, wherein in the second position the first and second electric motors drive the first and second drive wheel through the planetary gear set and differential; and
   a controller that controls operation of the clutch based on operating conditions.

2. The electrified powertrain of claim 1, wherein the planetary gear set comprises a carrier that is drivingly engaged to the differential.

3. The electrified powertrain of claim 1, further comprising:

a first reducer disposed between the first output shaft and the first drive wheel; and a second reducer disposed between the second output shaft and the second drive wheel.

4. The electrified powertrain of claim 1, wherein at least one of the first and second electric motors are induction motors.

5. The electrified powertrain of claim 1, wherein at least one of the first and second electric motors are permanent magnet motors.

6. The electrified powertrain of claim 1, wherein the clutch is a controllable one way clutch.

7. The electrified powertrain of claim 1, wherein the first and second electric motors are coaxially arranged.

8. The electrified powertrain of claim 1, wherein the controller is configured to command the clutch to operate in the first position based on first torque operating conditions.

9. The electrified powertrain of claim 8, wherein the controller is configured to command the clutch to operate in the second position based on second torque request operating conditions, wherein the second torque is higher than the first torque.

10. The electrified powertrain of claim 1, wherein the electric drive module is operable in a first drive mode wherein only the first electric motor provides drive torque and in a second drive mode wherein both of the first and second electric motors provide drive torque.

11. An electrified powertrain that generates and transfers drive torque to a driveline of an electrified vehicle, the electrified powertrain comprising:
  an electric drive module comprising:
    a first electric motor coupled to a first output shaft through a planetary gear set and a differential, the first output shaft configured to drive a first drive wheel;
    a second electric motor selectively coupled to a second output shaft through the planetary gear set and differential;
    a first reducer disposed between the first output shaft and the first drive wheel;
    a second reducer disposed between the second output shaft and the second drive wheel;
    a clutch that moves between:
      a first position that decouples the second electric motor from the second output shaft, wherein in the first position drive torque is provided to the first and second drive wheels exclusively from the first electric motor; and
      a second position that couples the second electric motor to the second output shaft, wherein in the second position the first and second electric motors drive the first and second drive wheel through the planetary gear set and differential; and
  a controller that controls operation of the clutch based on operating conditions.

12. The electrified powertrain of claim 11, wherein at least one of the first and second electric motors are induction motors.

13. The electrified powertrain of claim 11, wherein at least one of the first and second electric motors are permanent magnet motors.

14. The electrified powertrain of claim 11, wherein the first and second electric motors are coaxially arranged.

15. An electrified powertrain that generates and transfers drive torque to a driveline of an electrified vehicle, the electrified powertrain comprising:
  an electric drive module comprising:
    a first electric motor coupled to a first output shaft through a planetary gear set and a differential, the first output shaft configured to drive a first drive wheel;
    a second electric motor selectively coupled to a second output shaft through the planetary gear set and differential; and
    a controllable one way clutch that moves between:
      a first position that decouples the second electric motor from the second output shaft, wherein in the first position drive torque is provided to the first and second drive wheels exclusively from the first electric motor; and
      a second position that couples the second electric motor to the second output shaft, wherein in the second position the first and second electric motors drive the first and second drive wheel through the planetary gear set and differential; and
  a controller that controls operation of the clutch based on operating conditions.

16. The electrified powertrain of claim 15, wherein at least one of the first and second electric motors are induction motors.

17. The electrified powertrain of claim 15, wherein at least one of the first and second electric motors are permanent magnet motors.

18. The electrified powertrain of claim 15, wherein the first and second electric motors are coaxially arranged.

* * * * *